Jan. 14, 1936. W. A. SMITH, SR 2,027,562
FEEDING DEVICE
Filed Aug. 16, 1934
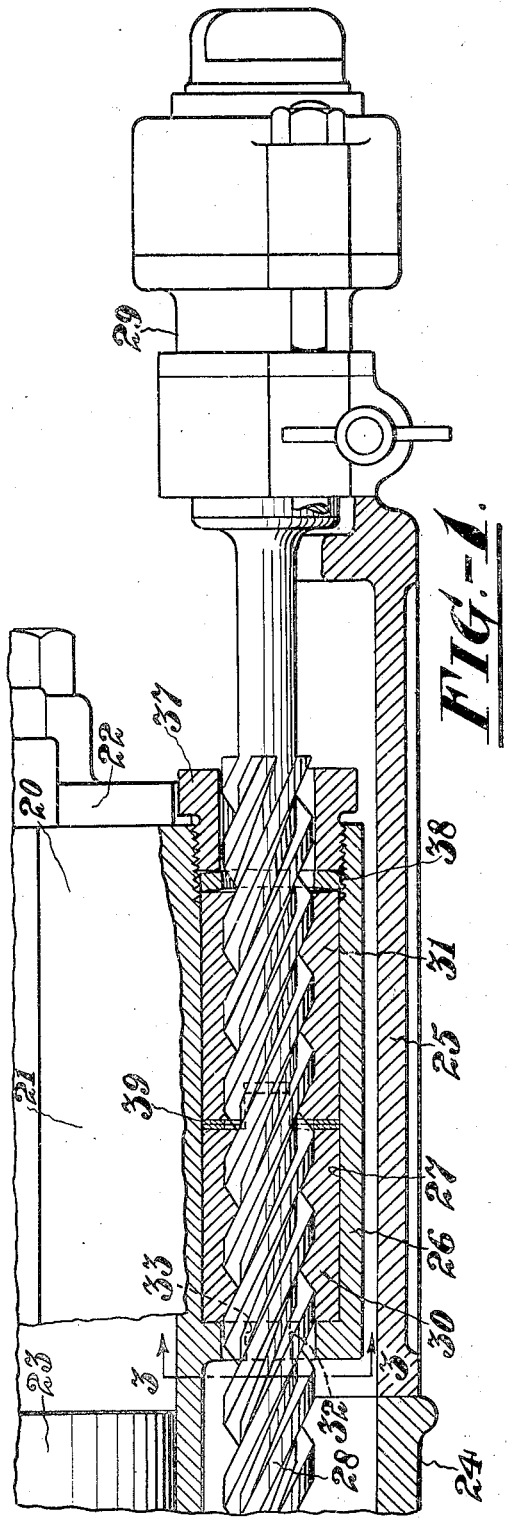
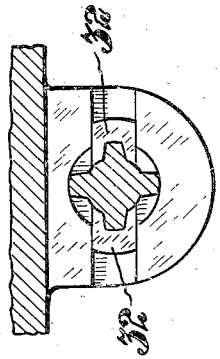
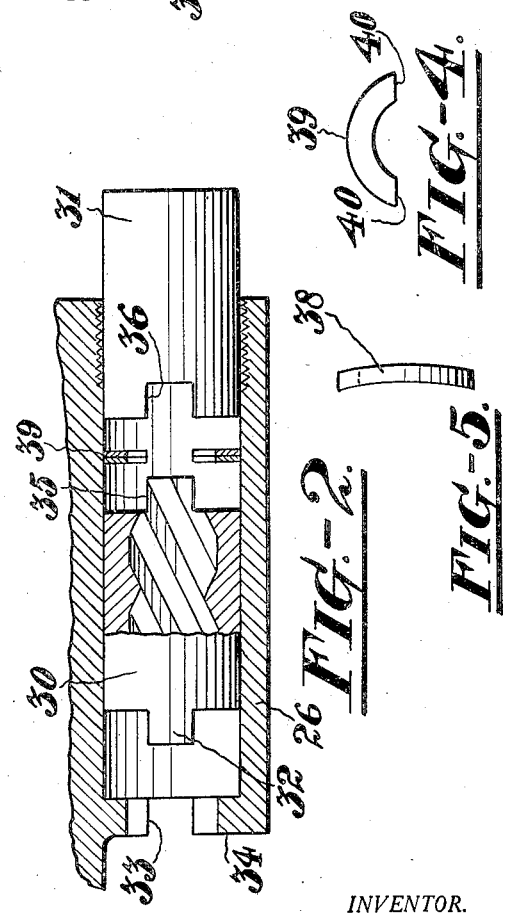
INVENTOR.
William A. Smith Sr
BY
HIS ATTORNEY Patented Jan. 14, 1936

2,027,562

UNITED STATES PATENT OFFICE 2,027,562

FEEDING DEVICE

William A. Smith, Sr., Athens, Pa., assignor to Ingersoll-Rand Company, Jersey City, N. J., a corporation of New Jersey Application August 16, 1934, Serial No. 740,070

3 Claims. (Cl. 74—424.8)

This invention relates to rock drills, and more particularly to a feeding device employed for effecting relative longitudinal movement between a rock drill and its support.

One object of the invention is to compensate for wear on the cooperating surfaces of the feed screw and the element or portion of the rock drill wherewith the feed screw is threadedly connected.

Other objects will be in part obvious and in part pointed out hereinafter.

In the accompanying drawing in which similar reference numerals refer to similar parts, Figure 1 is a longitudinal elevation, partly in section, of a portion of the rock drill and its support having the invention applied thereto, Figure 2 is a view similar to Figure 1 showing the manner in which the feed nuts may be assembled in the rock drill, Figure 3 is a transverse view taken through Figure 1 on the line 3—3, Figure 4 is an elevation of a detail, and Figure 5 is a view similar to Figure 4 of another detail.

Referring more particularly to the drawing, 20 designates a motor illustrated as a rock drill and of which only a portion of the cylinder 21 and a back head 22 are shown. Within the cylinder 21 is a reciprocatory hammer piston 23 to deliver blows of impact to the working implement such as a drill steel (not shown). A support is provided for the motor 20 in the form of a shell 24 having a rearward extension 25 which may be secured to the shell in any suitable manner.

The cylinder 21 carries the usual lug 26 which extends into the shell 24 and has a recess 27 to receive a feed screw 28 of which the front end may be supported by the shell 24 in the usual manner. The rear end of the feed screw may be connected to a suitable device designated 29 for determining the direction of rotation of the feed screw. The device 29 may be of a known type, as for instance that illustrated in the United States Patent No. 1,867,929, granted to W. A. Smith, Sr., July 19, 1932.

In accordance with the practice of the invention a pair of feed nuts 30 and 31 are disposed in the recess 27 and are internally threaded to cooperate with the threads of the feed screw 28. The nuts 30 and 31 are inserted into the recess 27 from the rear end thereof and on the front end of the nut 30 are diametrically opposed clutch members 32 which engage slots 33 in an end wall 34 of the lug 26 to prevent rotary movement of the nut 30 with respect to the lug 26.

In order to prevent rotary movement of the nut 31 within the recess 27 the adjacent ends of the nuts 30 and 31 are provided with suitable interlocking portions which may, as shown, consist of diametrically opposed lugs 35 on the end of the nut 30 and slots 36 in the adjacent end of the nut 31 to receive the lugs 35. The nuts 30 and 31 may be conveniently clamped in their assembled positions and against longitudinal movement with respect to the recess 27 by a sleeve 37 threaded into the rear end of the recess 27 to press the nuts toward the wall 34 and against which the nut 30 seats. Preferably, a spring washer 38 illustrated in detail in Figure 5 is interposed between the sleeve 37 and the nut 31 to compensate for any slight amount of wear which may take place on the outer ends of the nuts and also to lock the sleeve 37 securely in position.

In practice it has been found that, owing to the severe usage to which drilling mechanism of this character is subjected, the useful period of service of the parts comprising the feeding mechanism such as the screw 28 and the nuts 30 and 31, is generally of short duration. They soon become worn and the resulting loose connection between the rock drill and the feed screw permits of such a degree of vibratory movement of the rock drill that the threads are speedily reduced to a state of uselessness. Such clearance between the parts, moreover, reduces the effectiveness of the device 29 or means whereby rotary movement is imparted to the feed screw 28 and, unless a firm transmission path is established between the feed nut and the feed screw, a very considerable portion of the blow of the hammer piston 23 is wasted in shifting the rock drill the distance permitted by the clearance between the threads of the screw and the feed nuts.

In order, therefore, to compensate for any such wear as may take place on the side surfaces of the threads of the feed screw and the nuts a shim or shims 39 are interposed between the adjacent ends of the nuts 30 and 31. The shims may as illustrated in detail in Figure 4 be of segmental shape of which the end surfaces 40 may seat upon the sides of the lugs 35 in the assembled positions of the parts.

In practice the parts comprising the feeding mechanism are assembled in the manner illustrated in Figure 2, that is, the feed nuts 30 and 31 are inserted in the recess 27 in such positions that the clutch members 32 of the feed nut 30 engage the slots 33 of the lugs 26 and the lugs 35 will be in engagement with the slots 36. If required, to assure body contact between the sides of the threads on the feed screw 28 and the nuts, a shim or shims 39 may be introduced between the contiguous ends of the feed nuts. The feed screw is then threaded through the feed nuts and suitably connected to the shell 24. Thereafter, the sleeve 37 is threaded into the end of the recess 27 to compress the washer 38 and to clamp the feed nuts and the shims securely together.

If, after some period of usage, the threads of the feed screw and the feed nuts become worn, thus bringing about the undesirable condition above referred to, the sleeve 37 may be removed from the recess and after the feed screw has been released from the shell the same together with the feed nuts may then be moved rearwardly to expose the joint between the feed nuts. An additional shim or shims are then placed between the feed nuts to again bring the sides of its threads into close engagement with the thread of the feed screw and the parts are then replaced in their assembled positions and the nuts will again operate to prevent axial play between the screw and the rock drill at the instant of reversal of the hammer piston in the rock drill.

I claim:

1. In a feeding device, the combination of a casing and a feed screw extending through the casing, said casing having a recess and a wall at one end of the recess, a plurality of stationary feed nuts in the casing threadedly engaging the screw, and one of said nuts seating against the end wall, means interposed between the nuts for effecting axial adjustment thereof, and a sleeve threaded into the casing and acting against one nut to hold said nuts in adjusted position.

2. In a feeding device, the combination of a casing and a feed screw extending through the casing, said casing have a recess and a wall at one end of the recess, a plurality of feed nuts in the casing threadedly engaging the screw and one of said nuts seating against the end wall, means on one feed nut interlockingly engaging the casing to prevent relative rotary movement, shims interposed between the nuts for effecting axial adjustment of one nut with respect to another nut, and a sleeve threaded into the casing and acting against one nut to hold said nuts in adjusted position and to hold the other nut against the wall.

3. In a feeding device, the combination of a casing and a feed screw extending through the casing, a pair of feed nuts in the casing threadedly engaging the feed screw and being inserted from one end of the casing, there being interlocking portions on the nuts to prevent relative rotation between the nuts, means on one nut engaging the casing to prevent rotation of the nuts with respect to the casing, shims interposed between the nuts for effecting axial adjustment thereof, and a sleeve threaded into the casing and acting against one nut to hold said nuts against axial movement with respect to the casing.

WILLIAM A. SMITH, Sr.